United States Patent

Goudjil

[11] Patent Number: 6,113,813
[45] Date of Patent: Sep. 5, 2000

[54] PHOTOCHROMIC ULTRAVIOLET PROTECTIVE SHIELD

[76] Inventor: Kamal Goudjil, 3100 Pearl St., Suite B, Boulder, Colo. 80301

[21] Appl. No.: 09/267,948

[22] Filed: Mar. 11, 1999

[51] Int. Cl.[7] .............. G02B 5/23; G02B 5/22; F21V 9/04; G02C 7/10
[52] U.S. Cl. .......... 252/586; 252/589; 351/163; 359/885
[58] Field of Search .................... 252/586, 589; 351/163; 359/885

[56] References Cited

U.S. PATENT DOCUMENTS

| | | | |
|---|---|---|---|
| 3,635,544 | 1/1972 | Stamm et al. | 252/586 |
| 3,716,489 | 2/1973 | DeLapp | 252/589 |
| 3,725,292 | 4/1973 | Gerhardt | 252/589 |
| 3,756,692 | 9/1973 | Scott | 351/163 |
| 5,180,524 | 1/1993 | Casilli et al. | 252/586 |
| 5,330,686 | 7/1994 | Smith et al. | 252/586 |
| 5,391,327 | 2/1995 | Ligas et al. | 252/586 |
| 5,413,740 | 5/1995 | Lempicki | 252/589 |
| 5,770,115 | 6/1998 | Misura | 252/586 |
| 5,776,376 | 7/1998 | Nagoh et al. | 252/586 |
| 5,804,106 | 9/1998 | Yi et al. | 252/586 |
| 5,811,503 | 9/1998 | Herold | 252/586 |
| 5,879,591 | 3/1999 | Nagoh et al. | 252/586 |

Primary Examiner—Philip Tucker

[57] ABSTRACT

The present invention teaches a method for making a photochromic ultraviolet protective shield. The UV blocking eyewear uses a material which changes color when exposed to UV radiation. The obtained visible color is directly proportional to the intensity of ultraviolet light impinging the material. The photochromic ultraviolet protective shield is made by adjunction of photochromic compounds to a host polymer matrix. Incorporation of photochromics into a polymeric matrix involves the technique of injection molding, extrusion molding or cell-casting. This invention will offer the advantages i) to protect the eye or the face by absorbing the dangerous ultraviolet rays such as UV laser radiation ii) to reduce glare and squinting of the eye by automatically darkening in sunlight.

12 Claims, 4 Drawing Sheets

PHOTOCHROMIC ULTRAVIOLET PROTECTIVE SHIELD

BACKGROUND OF THE INVENTION

1. Field of the Invention

The present invention relates to ultraviolet plastic eyewear protection in a wide range of ultraviolet wavelengths in general and more specifically to an ultraviolet active shield using a photochromic compound which has been described in my earlier invention (U.S. Pat. No. 5,581,090). The photochromic compound is any molecule in the spiropyran, spiroxazine groups or chromene derivatives.

2. Description of the Prior Art

Ultraviolet optical shields are used in many areas which include: the manufacture of sunglasses, window glazing, ultraviolet protection in working environments were ultraviolet radiation is harmful to a person's health.

Nearly all protective eyewear found in the market is designed to be static in color vision with the exception of PHOTOGRAY lenses, developed by Corning Incorporated, NY, where the color is dynamic: the optical filter is responsive to the amount of visible and UV light present in sunlight. In the following paragraphs some of the existing technology will be discussed.

1. Factors influencing vision

The eyes need protection from various environmental factors. One of the main factors in vision is the amount of light reaching the retina in the eye. It has been established that intense illumination may result in sever discomfort due to glare. An individual's ability to tolerate glare decreases markedly with age: a 30 year old becomes uncomfortable with only 65% of the glare that a 20 year old can tolerate and by the age of 40 this is reduced even more to about 40% (Bennett, The demographic variable of discomfort glare. Lighting design and applications, 1977, 7, 22–24). In addition to discomfort, there is now evidence that electromagnetic radiation can damage various parts of the eye. Damage to the retina can result from unexpectedly low levels of light particularly at the shorter wavelengths (Ham et al., Retinal sensitivity to damage from short wavelength light. Nature, 1976, 260, 153–155). Therefore protection is needed against UV rays, the intensity of which doubles with every 3500 feet of altitude (Sliney et al. Evaluation of optical radiation hazards. Appl. Optics 1973, 12, 1–24). UV emitting lasers such as Excimer (248 nm, 308 nm, 351 nm) and HeCd lasers (325 nm, 354 nm) used in medical, research and various industries are also harmful to the eye and even skin (K. Goudjil and R. Sandoval, Photochromic Ultraviolet Light Sensor and Applications, Sensor Review, Vol. 18, No. 3, 1998). Excessive exposure to UV leads to swelling of cornea resulting in the ocular disease called: Keratoconjunctivitis generally known as snowblindness. UV radiation is also responsible of the development of cataracts in humans.

Protection against infrared radiation should also be considered. Long term exposure to IR has long been reported to cause cataracts (Zigman et al, Sunlight and human cataracts. Invest. Ophtalmo. 1979, 18, 462–467). Although the levels of Solar IR intensity reaching earth surface are too low to produce an injury, it is, however, necessary to shield against higher intensity of infrared radiation particularly light engendered by intense sources such as lasers ($CO_2$, NdYAG.). The Human eye can focus even a low-power laser beam to a tiny spot, increasing its irradiance about 100,000 times (Kevin Robinson, Laser Safety: Powerful Tools Need Powerful Protection, Photonic Spectra, October 1998, pp. 92–100).

2. Glare

Glare is caused by a relatively bright light or lights within the visual field of view which degrade vision and may result in discomfort (D. H. Brennan, Glare in Aviation, Health Physics, Vol.56, NO. 5, pp. 665–669, 1989). The visual deficit is maximal when the object of visual interest or target is close to the glare source. In aviation solar glare is reduced by sunglasses or tinted visors.

In addition to the glare from direct light there is veiling glare which is engendered by scattered or reflected light on the visors thus degrading the contrast in the visual scene. Individuals may see reflections of their own faces on their visors when in direct sunlight. The incidence of reflections should be minimized by plastic filters which allow light to travel in one direction. In general glare depends on the visual environment. Glare is dynamic in a sense that change in lighting conditions induces a variation in reflections and scattering of light (TJTP Van Den Berg, On the relation between glare and straylight, Documenta Ophtalmologica 78: pp. 177–181, 1991). Furthermore, as mentioned above, different individuals may be affected differently by various levels of lighting conditions.

3. Eyewear

For these reasons, some sort of eyeglasses, goggles or face shields is often indispensable. The utility of such eyewear depends on the extent of which it satisfactorily respond to 3 main criteria: (i) what are the optical properties of the lenses material: What is the total transmittance of the various components of radiation Ultraviolet, Visible and IR. What is their optical quality, freedom from distortion and the like. (ii) How resistant are the eyewear to fogging and (iii) how are the characteristics such as acuity, target detection and vision through field glasses affected by the goggles.

Most eyewear found in commerce is made of plastic to reduce weight and increase comfort level for the wearer. Goggle filters come in variety of colors: neutral, yellowish-neutral, yellow, yellow green, blue, rose, and purple. Some of the glasses found in the market have polarizing filters.

Commercially available glasses are intended first of all to prevent damage from electromagnetic radiation. One of the application has been to wear such goggles in snow fields and in sea where the amount of ultraviolet radiation present is almost doubled due to the properties of snow and water to reflect most of the UV rays. Another application is the protection against inadvertent laser reflection. However, most of existing eyewear does not provide adequate level of enhancing vision. This limitation is due to fact that optical density or transmission characteristics of materials used in eyewear is flat across all wavelengths. Safety is compromised by the reduction of visual awareness caused by conventional eye protection. This characteristic has been outlined in the invention of Donald D. Scott, U.S. Pat. No. 3,756,692 where a protective lens structure of variable opacity for installation in welder's face shield is disclosed. In particular Scott teaches a darkening UV material using an alkaline earth compound as the UV active component. However, in this instance, an ultraviolet reflecting means is necessary to block the whole range of ultraviolet radiation wavelengths.

In the U.S. Pat. No. 5,531,040 Gupta et al teach methods for making optical quality plastics lenses with photochromic additives. A casting resin containing photochromic additives is arranged between a lens mold and then cured. However, adjunction of ultraviolet stabilizers to the mixture to increase lifetime of the products was not mentioned. In addition, Gupta et al used a UV curing method which is known to be harmful to the photochromic compounds since UV radiation induces the formation of radicals, especially when the polymer matrix is not totally cured (monomers are present). Therefore, it is judicious to add ultraviolet stabilizers as well as anti-oxidant agents to the photochromic polymeric composition and refrain from using ultraviolet curing techniques when the mixture is not totally cured. The present invention teaches an ultraviolet active shield in a wide wavelength range with better lifetime and better stability. In addition the present invention teaches an ultraviolet shield capable of protecting the eye from a direct ultraviolet laser hit as demonstrated in the preferred embodiment.

SUMMARY OF THE INVENTION

The present invention relates to ultraviolet plastic eyewear protection in a wide range of ultraviolet wavelengths in general and more specifically to an ultraviolet active shield using a photochromic compound which has been described in my earlier invention (U.S. Pat. No. 5,581,090). The photochromic compound is any molecule in the spiropyran, spiroxazine groups or chromene derivatives described in the invention of U.S. Pat. No. 5,702,645.

Specifically, this UV protection eyewear uses a material which changes color when exposed to UV radiation. The obtained visible color is directly proportional to the intensity of ultraviolet light impinging the material. This color changing property is crucial since it will adaptively change to varying levels of brightness of sunlight. This will allow improving human visual performance over a range of light conditions by reducing the glare produced by various sources. This is important in outdoor activities where sunshine is present. This invention will offer the advantages i) to protect the eye or the face by absorbing the dangerous ultraviolet rays such as but not limited to laser radiation ii) to reduce glare and squinting of the eye by automatically darkening in sunlight. This technology may also be used as a light filter on a binocular for the enhancement of visibility of distant objects. This is of special importance in highly reflective environments such as snow and ocean where the amount of UV is almost doubled.

This technology will provide individuals more comfort for the vision by allowing totally transparent vision when indoor (no UV present) while darkening in sunlight or in general the presence of ultraviolet but more importantly this invention will provide means to shield one's eyes or face from harmful ultraviolet rays. Another aspect of the invention is to allow a wearer a transparent vision when manipulating UV lasers in various environments while allowing total protection when inadvertent UV laser reflection occurs. This feature is of importance in a medical operating room where a physician needs total transparent goggles to be able to distinguish details of biological tissue of the patient while being totally shielded from UV radiation. Another important aspect of the invention is to provide ultraviolet protection for a patient who undergone facial or eye surgery. A further aspect of the invention is improving human visual performance over a range of light conditions by reducing glare effects in sunlight.

Although the idea of incorporating ultraviolet sensitive chemicals in optically clear polymer matrices such as acrylics, vinyls, cellulosics, epoxies, polyesters, polystyrenes, alkyds, polyamides (nylons), polyurethanes, polycarbonates etc. has been already suggested in other inventions (c.f., my invention, U.S. Pat. No. 5,581,090 and the references listed therein), the present invention is an extension of my previous inventions where I discussed the use of photochromic chemicals as ultraviolet sensitive media in various applications. Among the large family of photochromic compounds figure three families of molecules called spiropyrans, spiroxazines and chromene derivatives. These molecules are well known for their property of photo-reacting to ultraviolet light [200 nm–400 mn] by changing from clear to a variety of colors and shades. The photochromic compounds appear as colorless form but undergo a photochemical transformation under UV radiation to an intensely colored form. A detailed description of the chemical and physical characteristics of these compounds has been given in the U.S. Pat. No. 5,581,090 and U.S. Pat. No. 5,702,645 and the references cited therein. The intensity of the resulting visible color (blue, violet, red.) is directly proportional to the intensity of the UV light source: the more intense the UV light the more intense the resulting visible color is.

1. Injection molding

The incorporation of photochromics into a polymeric matrix involves the technique of injection molding or extrusion molding of plastics. The photochromic chemical is mixed with plastic beds prior to introduction into an injection/extrusion molding machine and then molded to form a polymer medium exhibiting a photochromic behavior. Examples of suitable plastic host materials are optically clear plastics which include polyol(allyl carbonate)-polymers, polyacrylates, polyethylene, polypropylene, polyvinyl chloride, polymethyl methacrylates, cellulose acetate, cellulose triacetate, cellulose acetate propionate, cellulose acetate butyrate, polyacetal resin, acetyl cellulose, poly (vinyl acetate), poly(vinyl alcohol), polyurethanes, polycarbonates, polystyrene, poly(styrene methylmethacrylate) coopolymers, poly(styrene acrylonitrile) coopolymers, and polyvinylbutyral.

Tests with injection molding showed that soft plastics such as vinyl, polyethylene, polypropylene are good matrices for hosting the photochromic compounds. This may be explained in terms of dynamical behavior of the photochromic compounds when irradiated with ultraviolet radiation. Indeed, the spiroxazine molecule in open form is likely to relax faster to the clear form (closed stable form) when imbedded in a soft material. In other words, in terms of energy correlation, the open-form molecule generated by irradiation with ultraviolet overcome more easily the energy barrier existing between the ground state open-form and ground state closed-form when the photochromic compound is imbedded in a soft matrix.

2. Extrusion Molding

Extrusion molding is a process that continuously forms a particular shape by forcing a heated polymeric material through a calculated opening in a die in order to produce a desired finished cross section. The main application of extrusion is the production of continuous lengths of film, sheeting, pipe, filaments, and other useful forms and cross sections. After the plastic melt has been extruded through the die, the extruded material is hardened by cooling, usually by air or water. The produced plastic material may later be cut to extract any desired shape.

3. Cell Casting

Other method for creating clear sheets of plastic is by the technique of cell casting. Photochromic chemicals are incorporated into acrylic (Methyl Methacrylate or MMA) using the technique of cell casting. The liquid monomer containing the ultraviolet active compounds and ultraviolet stabilizers and anti-oxidants is cured by adding a thermal polymerization initiators such as peroxides and azo alkanes to form hardened polymethyl methacrylate sheets. Acrylic sheets are produced by cell casting between plate glass cells. Cell-cast sheet acrylic has the best optical characteristics. Acrylic sheets can be later shaped on most conventional thermoforming equipment. Regidized acrylic sheets may be produced by co-extrusion with stronger plastics. Preferred materials to be used in cell casting are monomers selected from the group consisting of acrylates monomers, urethane monomers, ester monomers, styrene monomers, vinyl monomers and allyl monomers. In addition, two or more monomers may be used in conjunction to form a copolymer upon curing. As mentioned previously, photochromic compounds are preferably incorporated in a low cross-link density polymer matrix in order to allow freedom of phototransformation of the photochromic molecule upon irradiation with ultraviolet light.

4. Stabilizers

As it has been pointed out in my previous inventions the photochromic substance has a limited life time due to oxidation processes. The adjunction of UV stabilizers are recommended. After performing testing on different stabilizers available in the market, TINUVIN 765 and TINUVIN 144 Hindered Amine Light Stabilizers, supplied by Ciba, Additive Division, have been selected for their performance under sunlight. The stabilizers are added in a proportion of 1% to 5% in weight. TINUVIN 765 product has the following chemical formula: bis(1,2,2,6,6-Pentamethyl-4-piperidinyl) sebacate in (75–85% by weight) and Methyl(1,2,2,6,6-pentamethyl-4-piperidinyl) sebacate in (15–25% by weight). The chemical formula for TINUVIN 144 is: bis(1,2,2,6,6-Pentamethyl-4-piperidynyl) (3,5-di-tert-butyl-4-hydroxybenzyl) butylpropanedioate. The Hindered Amine Light Stabilizers are incorporated in the photochromic composition so as to be in close physical proximity to the organic photochromic compounds imbedded in organic matrices (clear polymers). For more increased stability, anti-oxidants are added to the polymeric matrix. For example, IRGANOX chemicals supplied by Ciba are chosen for their ability to effectively inhibit oxidation and thermal degradation of many organic and polymeric materials. IRGANOX 1076 with the chemical name Octadecyl 3,5-di-tert-butyl-4-hydroxyhydrocinnamate, and IRGANOX 259 with the chemical name Hexamethylene bis(3,5-di-tert-butyl-4-hydroxyhydrocinnamate) supplied by Ciba Additive division have been tested. Anti-oxidant chemicals are added in proportion of 1% to 3% by weight to the polymeric matrix.

DESCRIPTION OF THE PREFERRED EMBODIMENT

Photochromic compounds are added to the polymer matrix in a concentration of 0.01% to 5% by weight. The concentration of photochromics may be adjusted to achieve the desired characteristics such as clarity, activated color hue and the ability to effectively block ultraviolet radiation. In order to slow down the oxidation processes, due to radicals present in the polymer, ultraviolet stabilizers are incorporated into the polymer matrix in a proportion of 1% to 5% by weight. Anti-oxidants are also added to increase lifetime. Anti-oxidant chemicals are added in proportion of 1% to 3% by weight to the polymeric matrix.

A working model of this ultraviolet shield was made for me, following the directions provided here, by Acrylex Corporation based in Jersey City, N.J. starting Jul. 16th, 1998 and finished Jul. 24th, 1998. It was made with acrylic resin using the technique of cell casting. The acrylic shield was fabricated with thicknesses of 0.100 and 0.060 inch. The concentration of chemicals injected into the acrylic matrix (methyl methacrylate monomer) are as follows:

0.3% in weight of the total weight of the acrylic resin of photochromic material 2% in weight of the total weight of the acrylic resin of TINUVIN 144 (purchased from Ciba Additive Division)

2% in weight of the total weight of the acrylic resin of TINUVIN 765 (purchased from Ciba Additive Division)

1% in weight of the total weight of the acrylic resin of IRGANOX 1076 (purchased from Ciba Additive Division)

The various chemicals are mixed to the acrylic resin in order to allow a homogenous dispersion. The chemicals are dissolved into the acrylic resin (monomer). The acrylic sheet is obtained by cell casting between plate glass cells and cured by adjunction of curing agents such as peroxide or azo alkaline compounds at a temperature of 50 to 150 deg. C in an oven. This operation is performed in absence of any ultraviolet light to reduce the formation of radicals. This method has been selected for its best optical clarity results. The formed sheet is then cut and shaped using most conventional thermoforming equipment.

The fabricated, totally cured, acrylic sheet was taken outside into the sunlight and an immediate color change occurred. The acrylic sheet went from a colorless state to an intensely colored sheet. The acrylic sheet was also exposed to an artificial ultraviolet source (a black light) and the sheet exhibited the same color change within few seconds. The sheet went back to a colorless state as soon as removed from the ultraviolet light source. This reversible process was repeated numerous times without altering the photochemical properties of the polymer matrix and photochromic compounds. The same experiment was performed with a solar simulator delivering up to 20 times the intensity of the sun in the middle of summer. The acrylic sheet imbedded with the UV sensitive compounds showed the same fast color transformation behavior.

Figure 1A:
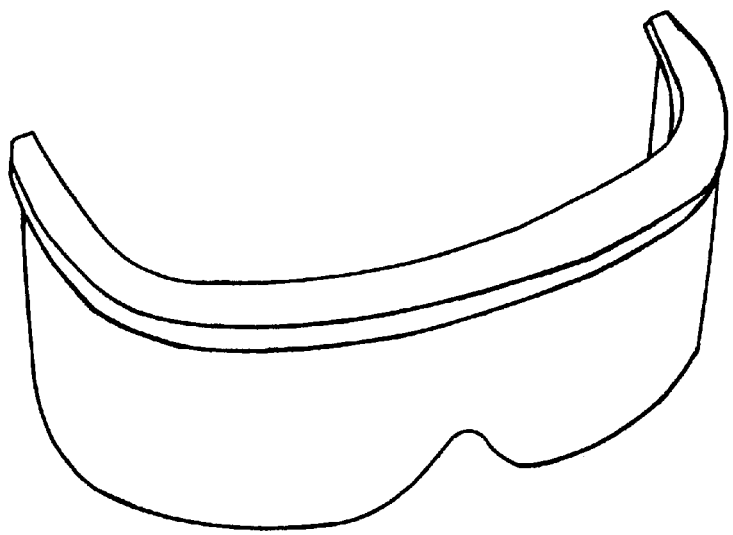
FIGS. 1(a) and (b). Shows the embodiment of the photochromic ultraviolet protective shield, where the photochromic compounds are imbedded in the optically clear polymer matrix; (a) eye shield configuration, (b) face shield configuration.
Figure 1B:
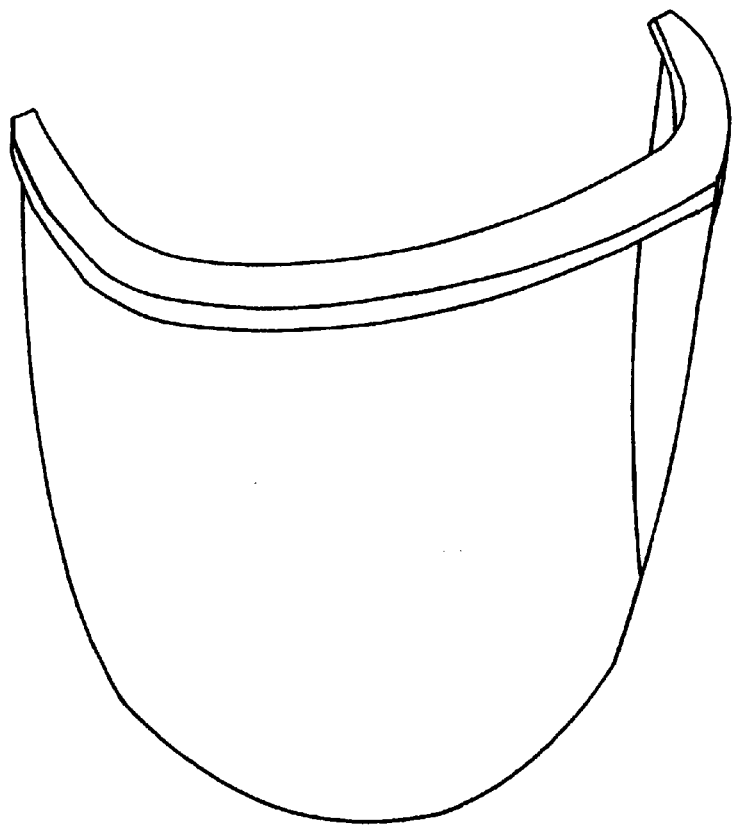
Figure 2:
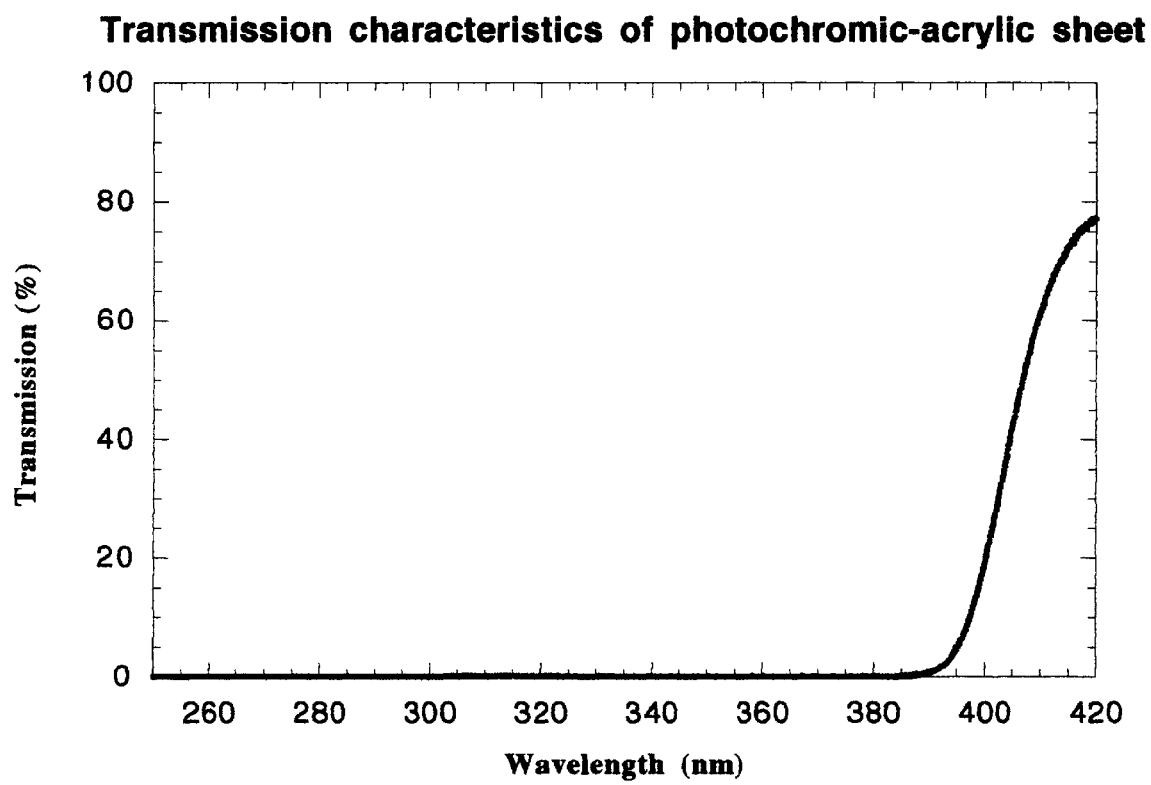
FIG. 2. Shows a graph of the transmission proprieties of the photochromic ultraviolet protective shield in the ultraviolet wavelength band. In particular, it is shown the transmission is 0 from 250 nm to 400 nm.

A test for determining if the acrylic sheet was blocking ultraviolet was performed by exposing the sheet to an intense broadband ultraviolet light source (2J/cm2) from one side while detecting the presence of ultraviolet light from the opposite side of the sheet. The UV source consists of a Xenon Lamp focused onto a liquid light guide for transporting the light to the sample to be tested. The experiment showed that the fabricated acrylic sheet containing the photochromic compounds while changing color from colorless to a visible color allowed the ultraviolet light to be blocked efficiently (totally). In other words the fabricated sheet absorbed 100% of the ultraviolet light intensity and no ultraviolet light was transmitted through it (transmission= 0%) as shown on FIG. 2. A transmission of 0% is translated in terms of Optical Density (OD) to be greater than 5.

In addition, test results demonstrated the effectiveness of the acrylic photochromic sheet in blocking a direct hit of a UV laser for more than 30 seconds. This test was performed in collaboration with Spectranetics Corporation, a manufacturer of excimer lasers, based in Colorado Springs, Colo. The acrylic photochromic sheet was irradiated with a pulsed excimer XeCl Laser (308 nm) having the following characteristics:

Pulse energy=140 mJ
Repetition rate=80 Hz
Pulse duration=130 ns
Wavelength=308 nm
Beam dimensions=1.875 cm×3.74 cm=7 cm2
Irradiance is calculated to be=3.6 W/cm2

The transmission at this particular laser wavelength is 0% equivalent to an Optical Density greater than 5 (OD>5). It is, therefore, clear this photochromic acrylic sheet can be used safely as a UV laser shield.

Figure 3:
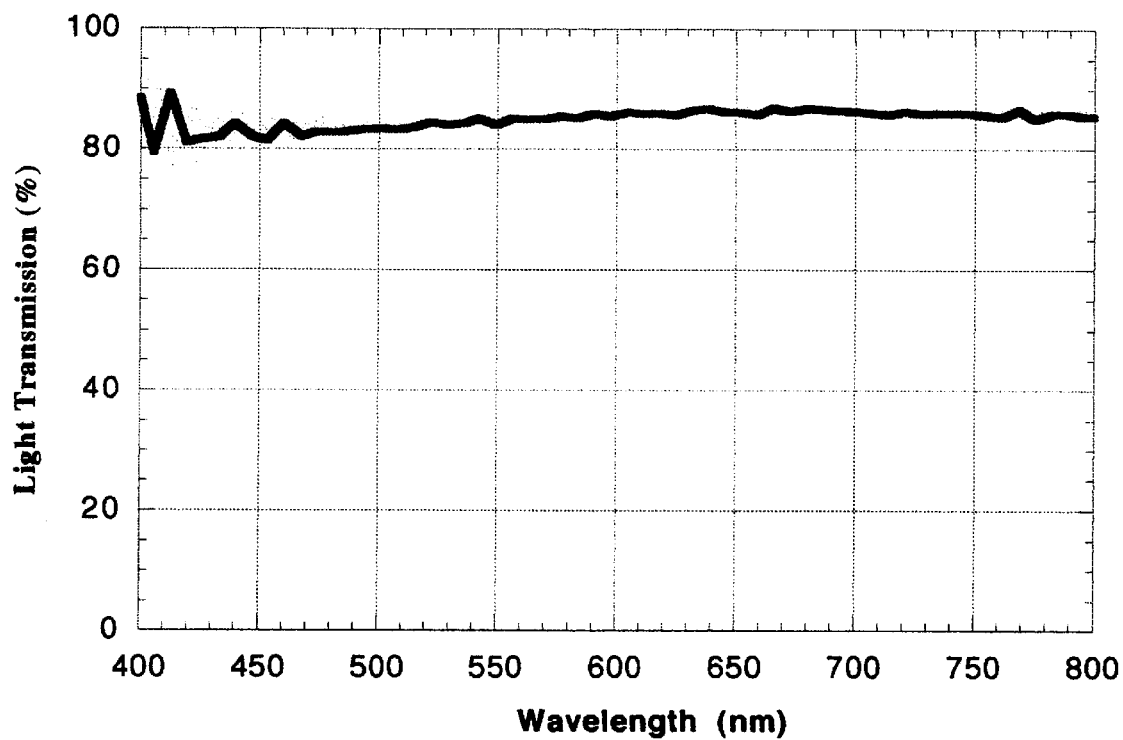
FIG. 3. Shows a graph, in the visible wavelength band, of the transmission proprieties of a blank acrylic sheet which does not contain any photochromic molecules.
Figure 4:
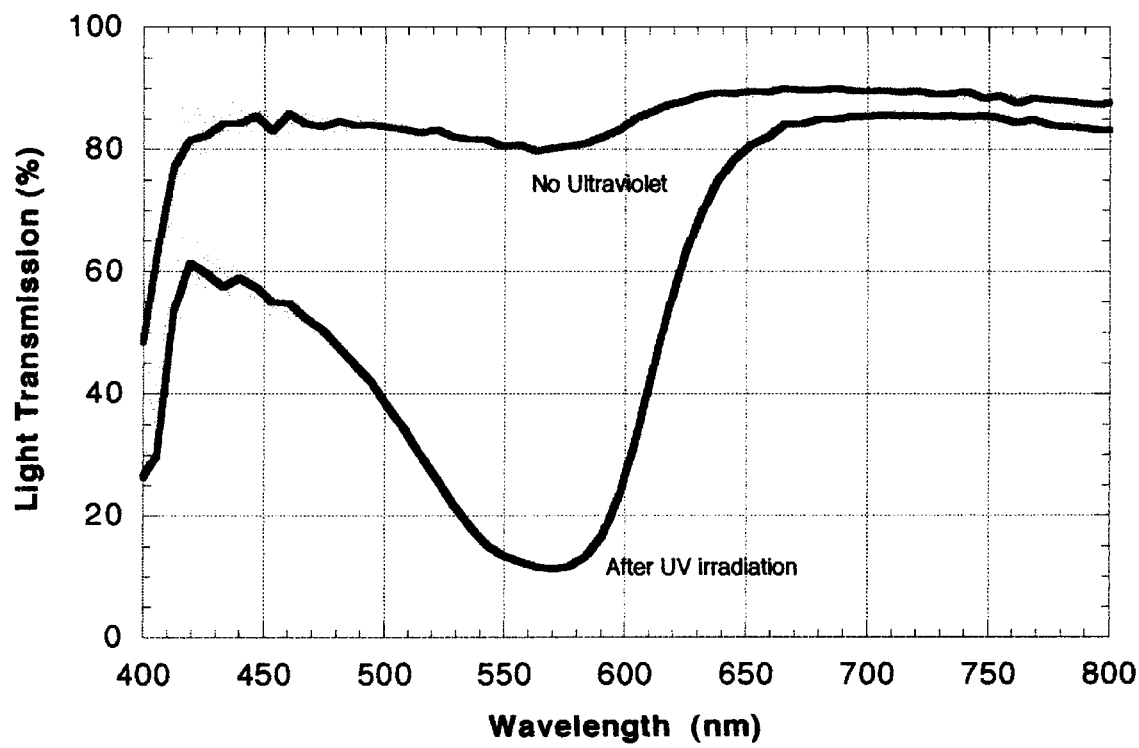
FIG. 4. Shows a graph of the transmission proprieties of the photochromic ultraviolet protective shield, in the visible wavelength band, with and without activation with ultraviolet radiation.

Experimental results reported on FIG. 3 and FIG. 4 show a minor difference between the transmission profile in photochromic-acrylic sheet with no ultraviolet excitation and the blank acrylic sheet (average transmission equal to 90%). The dip around 570 nm represents the absorption peak of the photochromic molecule in a Polymethyl Methacrylate matrix. The only change in transmission involved after excitation with ultraviolet radiation is around 570 nm peak (FWHM=100 nm). The transmission remains unchanged after 650 nm. This behavior allows, in addition to 100% ultraviolet block, the ability to filter out the blue band eliminating in this way the glare effect in vision under sunlight. Selection of a specific photochromic molecule enables modification of the transmission behavior with regard to wavelength (visible) dependence. This feature allows selection of the wavelength bandwidth (in the visible) to be attenuated. This is of importance since various environments require various light filters.

While the invention has been particularly shown and described with reference to a preferred embodiment, it will be understood by those skilled in the art that various changes in form or in detail may be made therein without departing from the spirit and scope of the invention. For instance, the present photochromic ultraviolet active protective shield may be shaped to fit any eyewear. The present invention may be incorporated in existing eyewear or incorporated as a light filter on a binocular for the enhancement of visibility of distant objects. In addition numerous polymer matrices are compatible to carry the photochromic compound this allows fabrication of various forms of photochromic ultraviolet protective shields.

What is claimed is:

1. A method for protecting against ultraviolet laser radiation from 180 nm to 400 nm wherein method comprises the steps of:

providing a photochromic compound including at least one of a spiroxazine and a spiropyran molecule and a chromene derivative, said photochromic compound being capable of substantially completely blocking potentially harmful UV radiation;

providing a monomer selected from the group consisting of acrylates monomers, urethane monomers, ester monomers, styrene monomers, vinyl monomers and allyl monomers;

providing an ultraviolet light stabilizer and an anti-oxidant;

mixing the said photochromic compound and the said ultraviolet light stabilizer and anti-oxidant compounds with the said monomer to produce a photochromic-monomeric composition;

casting the said photochromic-monomeric composition in the form of a protective sheet;

curing the said photochromic-monomeric composition to form a photochromic-polymeric optically clear material wherein said clear material has a photochromic ultraviolet laser radiation shielding property; and, forming the said photochromic-polymeric clear material into the form of a shield.

2. A method as set forth in claim 1, wherein said step of providing a photochromic compound comprises obtaining said photochromic-monomeric composition by dissolving said photochromic compound and said ultraviolet stabilizers and anti-oxidants into the said monomer.

3. A method as set forth in claim 1, wherein said photochromic compound is used in a concentration between 0.01% to 5% percent by weight of said monomer.

4. A method as set forth in claim 1, wherein said ultraviolet light stabilizer includes a hindered amine light stabilizer.

5. A method as set forth in claim 4, wherein said hindered amine light stabilizer is used in a concentration between 1 to 5 percent by weight of said monomer.

6. A method as set forth in claim 1, wherein said anti-oxidant includes a hindered phenolic anti-oxidant.

7. A method as set forth in claim 6, wherein said hindered phenolic anti-oxidant is used in a concentration between 1 to 3 percent by weight of said monomer.

8. A method as set forth in claim 1, wherein said step of curing comprises curing said photochromic-monomeric composition with adjunction of a curing agent.

9. A method as set forth in claim 8, wherein said curing agent is selected from the group of peroxide and azo alkaline compounds.

10. A method as set forth in claim 1, wherein said curing method consists of curing the photochromic-monomeric composition between glass-plates at a temperature between 50 and 150 deg. C.

11. A method as set forth in claim 1, wherein said cured polymeric sheet is thermoformed and cut to produce a desirable shape.

12. A method for protecting against ultraviolet laser radiation of claim 1, wherein the fabricated photochromic-polymeric sheet contains means providing protection against laser ultraviolet radiation with an optical density (OD) greater than 5.

* * * * *